Patented May 23, 1933

1,910,948

UNITED STATES PATENT OFFICE

CAMILLE DREYFUS, OF BASEL, SWITZERLAND, ASSIGNOR TO CELANESE CORPORATION OF AMERICA, A CORPORATION OF DELAWARE

MANUFACTURE OF ARTICLES MADE UNDER HEAT AND PRESSURE

No Drawing.   Application filed January 18, 1922. Serial No. 530,170.

This invention relates to the manufacture of pressed and moulded articles having a basis of or containing organic esters or ethers of cellulose, hereinafter referred to as organic derivatives of cellulose, and in particular to the manufacture of pressed and moulded articles having a basis of or containing cellulose acetate.

I have found that acetate of cellulose can be transformed into sheets, blocks or articles of any description, showing high strength and homogeneous structure and other qualities if cellulose acetate-powder is incorporated in an appropriate way with appropriate substances and then allowed to be heated under pressure, be it in moulds or other fashion.

The appropriate substances for the purpose comprise one or more softening or plastic inducing substances, hereinafter referred to as plasticizing agents, and a liquid carrier or vehicle for the plasticizing agent. Such softening or plastic inducing substances are for example triacetin, camphor, isomeric xylene low carbon alkyl sulfonamids, diethylphthalate, triphenyl phosphate, tricresylphosphate, mannol, resorcin diacetate, mirbene oil, glycerine, or others having a plastic inducing action on the organic cellulose derivative, while appropriate vehicles for the plasticizing agents are for example benzol, alcohol-benzol mixtures, water-benzol mixtures, water-alcohol-benzol mixtures, water-alcohol mixtures, petrols, gasolines, benzines, toluol and others. While alcohol may be used alone as a vehicle for the plasticizing agent it is not very satisfactory for the obtainment of good homogeneous moulded articles.

If, for instance, cellulose acetate-powder is treated with a mixture of triphenyl phosphate plus triacetin plus alcohol, a powder is obtained after evaporation of the alcohol which when subjected, for instance in a mould, to heat and pressure, will give moulded articles but does not give a good homogeneous article.

I have found, however, that in replacing alcohol in this case, by benzol, or by water plus alcohol benzol, or by water plus benzol, or by water plus alcohol, a powder is obtained after drying which with low heat of approximately 120° C. and a low pressure, gives an excellent moulded sheet or block, or other article.

Example 1

100 parts cellulose acetate powder are thoroughly treated with a mixture of 140 parts water, 10 parts triphenylphosphate, 30 parts of triacetin, 12.5 parts of alcohol, and 12.5 parts of benzol. Then the whole mixture is allowed to dry. The dry powder obtained can be pressed under heat into sheets, blocks, or articles of all kinds, and the products so obtained are, besides other qualities, very strong, tough and homogeneous.

Example 2

100 parts of cellulose acetate powder are thoroughly treated with a mixture of 30 parts of triacetin, ten parts of camphor, plus benzol as a vehicle, e. g., 165 parts. Again a powder is obtained after evaporation of the benzol, giving under heat and pressure, sheets, blocks, or other articles of all kinds of very remarkable strength and homogeneity, which can be boiled in water without destruction.

Example 3

100 parts cellulose acetate powder are thoroughly treated with a mixture of 20 parts of triacetine, 10 parts isomeric xylene monomethylsulfonamid, 10 parts of camphor plus benzol as a vehicle, e. g., 165 parts. After evaporation of the benzol a powder is obtained giving, under heat and pressure, sheets, blocks or other articles of all kinds having very remarkable strength and homogeneity. Inflammable character of the camphor can be reduced by addition of triphenylphosphate, tricresyl phosphate or other phosphates or appropriate substances.

Example 4

100 parts cellulose acetate powder are thoroughly mixed with 5 parts glycerine in 140 parts water and the water then evaporated until the powder is sufficiently dry to be pressed under heat into sheets or blocks, or articles of all kinds.

This invention is not limited to the above examples. On the contrary, these examples can be varied in different directions both as to the quantities employed and as to the substances used.

In addition or instead or partly instead of the glycerine, triacetin, triphenylphosphate, camphor, or other plasticizing agents particularly specified in the above examples, other similarly acting substances or mixtures of substances can be used in appropriate quantities, to obtain a desired moulded or pressed article, and in varying those quantities a range varying from very hard to very soft moulded or pressed articles or sheets can be obtained according to the quantity of the substances so added.

In addition to the substances mentioned in the above examples, stabilizers can be added, such as urea or urea derivatives, acetanilide or other stabilizing substances or mixtures thereof.

In addition to or instead or partly instead of benzol, water, alcohol, in the above examples (or their modifications) diluents such as petrols, gasolines, benzines, toluol, or other appropriate vehicles can be used, whether of organic or inorganic nature, or mixtures thereof.

In addition to or instead or partly instead of acetate of cellulose powder in above examples (or in their modifications) other organic cellulose ester powders, or cellulose ether powders, can be used.

The powdered cellulose acetate or other organic cellulose derivative can be mixed with desired quantities or mixtures of metal powders, pulverized filling materials, pigments, mineral powders, soluble dyes, insoluble dyes, dye stuffs, mica, fibrous materials, or other appropriate materials, and then be heated and pressed into sheets, or blocks, or other moulded or pressed articles of all kinds. (This mixture can be made before or after the treatment of cellulose acetate powder with a vehicle containing the camphor, camphor substitutes or other plastic inducing agent.)

Very good pressings or mouldings are obtained in the presence of approximately 5% of water in the powders subjected to the pressing or moulding.

Hollow mouldings or pressings can be executed if desired, by insertion of core pieces, linings, and the like, or the pressings or mouldings can be executed in such a way that the core pieces remain in, or are a part of the moulded or pressed sheet, block or other article, be it that the core pieces consist of thread, wire, nettings, sheets, fabrics, or bodies of any kind in metal, cotton, silk, wood, paper, cardboard, compositions, ebonite, or any other appropriate material.

The powders or mixtures of powders obtained according to the above description, can be pressed in heated moulds or press devices of any description, to produce blocks, sheets or articles of all kinds, or they can likewise be pressed under heat into articles or on top of articles of other materials in any other appropriate fashion, adhering permanently to such articles or materials. For instance, the powders can be spread on a sheet of fabric, paper, cardboard or metal, or on a sheet of other material or on an article, and pressed on by a roller or other device, the roller or device being heated up to the appropriate temperature, and so for instance, different layers of fabrics or other materials alternating with layers of above powders can be superposed and pressed under heat into compound sheets, blocks, insulating pipes, or other pipes, phonograph records or other articles of all kinds.

The sheets, articles, blocks, or other articles, obtained according to the present invention, can be easily machined, twisted, cut, drilled, bent, or otherwise worked and especially when heated to an appropriate temperature. These articles can be remoulded or repressed into other articles when heated again under pressure.

On the other hand, the pressed or moulded material or articles obtained by the present invention can be transformed when heated up to an appropriate temperature into blown articles, by the well-known blowing methods. It is further very interesting that the acetate powders or the once pressed or moulded materials as prepared according to above description, can be pressed (if heated at the same time) through holes or open dies, and all kinds of pipes, rods, filaments, or other shaped articles can be extruded in this way.

It is further of interest that no seasoning is required and all the articles obtained according to above description are ready for use right away after the pressing or moulding.

What I claim and try to secure by Letters Patents is:

1. A process of preparing a molding powder comprising treating an organic derivative of cellulose in finely divided form with a mixture of a plasticizing agent and a substantial quantity of a volatile liquid that is a vehicle for the plasticizing agent and is a non-solvent for the organic derivative of cellulose and evaporating the liquid vehicle at least partially.

2. A process of preparing a molding powder comprising treating cellulose acetate in finely divided form with a mixture of a plasticizing agent and a substantial quantity of a volatile liquid that is a vehicle for the plasticizing agent and is a non-solvent for the cellulose acetate and evaporating the liquid vehicle at least partially.

3. A process of preparing a molding powder comprising treating an organic derivative of cellulose in finely divided form with a mixture of a plasticizing agent and a substantial quantity of a volatile liquid that is a vehicle for the plasticizing agent and is a non-solvent for the organic derivative of cellulose, which liquid vehicle contains water, and evaporating the liquid vehicle at least partially.

4. A process of preparing a molding powder comprising treating an organic derivative of cellulose in finely divided form with a mixture of a plasticizing agent and a substantial quantity of a volatile liquid that is a vehicle for the plasticizing agent and is a non-solvent for the organic derivative of cellulose, which liquid vehicle contains water, and evaporating the liquid vehicle until the product contains substantially about 5% of water.

5. A process of preparing a molding powder comprising treating an organic derivative of cellulose in finely divided form with a mixture of a plasticizing agent and a volatile liquid that is a vehicle for the plasticizing agent and is a non-solvent for the organic derivative of cellulose in amount greater than that of the organic derivative of cellulose and evaporating the liquid vehicle at least partially.

6. Process of preparing a molding and pressing powder comprising mixing substantially 100 parts of a powdered organic derivative of cellulose with substantially 140 parts of water and a plasticizing agent.

7. Process of preparing a molding and pressing powder comprising mixing substantially 100 parts of a powdered organic derivative of cellulose with substantially 140 parts of water and a plasticizing agent and evaporating the water until the powder contains substantially 5% of water.

8. Process of preparing a molding and pressing powder comprising mixing substantially 100 parts of a powdered cellulose acetate with substantially 140 parts of water and a plasticizing agent.

9. Process of preparing a molding and pressing powder comprising mixing substantially 100 parts of a powdered cellulose acetate with substantially 140 parts of water and a plasticizing agent and evaporating the water until the powder contains substantially 5% of water.

10. A process of preparing a molding powder comprising treating cellulose acetate in finely divided form with a mixture of a plasticizing agent and a substantial quantity of a volatile liquid that is a vehicle for the plasticizing agent and is a non-solvent for the cellulose acetate which liquid vehicle contains alcohol and evaporating the liquid vehicle at least partially.

11. A process of preparing a molding powder comprising treating cellulose acetate in finely divided form with a mixture of a plasticizing agent and a substantial quantity of a volatile liquid that is a vehicle for the plasticizing agent and is a non-solvent for the cellulose acetate which liquid vehicle contains a volatile hydrocarbon and evaporating the liquid vehicle at least partially.

12. A process of preparing a molding powder comprising treating cellulose acetate in finely divided form with a mixture of a plasticizing agent and a substantial quantity of a volatile liquid that is a vehicle for the plasticizing agent and is a non-solvent for the cellulose acetate which liquid vehicle contains benzol and evaporating the liquid vehicle at least partially.

In testimony whereof I have hereunto subscribed my name.

CAMILLE DREYFUS.